(12) United States Patent
Korhummel et al.

(10) Patent No.: US 9,679,239 B2
(45) Date of Patent: *Jun. 13, 2017

(54) INTEGRATED ON-CHIP ANTENNA

(71) Applicant: Verily Life Sciences LLC, Mountian View, CA (US)

(72) Inventors: Sean Korhummel, Mountain View, CA (US); Jiang Zhu, Mountain View, CA (US); Stephen O'Driscoll, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,016

(22) Filed: Oct. 7, 2016

(65) Prior Publication Data

US 2017/0061275 A1 Mar. 2, 2017

Related U.S. Application Data

(63) Continuation of application No. 14/840,148, filed on Aug. 31, 2015, now Pat. No. 9,489,606.

(51) Int. Cl.
*G06K 19/06* (2006.01)
*G06K 19/077* (2006.01)
*H01Q 7/00* (2006.01)
*G06K 19/07* (2006.01)

(52) U.S. Cl.
CPC ... *G06K 19/07775* (2013.01); *G06K 19/0704* (2013.01); *G06K 19/0709* (2013.01); *G06K 19/07779* (2013.01); *H01Q 7/00* (2013.01)

(58) Field of Classification Search
CPC ........ G06K 19/06; G06K 19/00; G06K 21/00; G06K 7/08; G06K 5/00; G06F 17/00
USPC ........ 235/492, 380, 487, 188, 451, 375, 488
See application file for complete search history.

(56) References Cited

U.S. PATENT DOCUMENTS

2009/0153260 A1* 6/2009 Rofougaran ........ H01L 23/5227
333/32

* cited by examiner

*Primary Examiner* — Edwyn Labaze
(74) *Attorney, Agent, or Firm* — McDonnell Boehnen Hulbert and Berghoff LLP

(57) ABSTRACT

The present disclosure is related to a microchip apparatus, where the microchip apparatus comprises a plurality of metallic layers. Each of the metallic layers may have a respective layer thickness. The microchip apparatus also comprises electronic components integrated within the metallic layers. The electronic components may be configured to communicate data. Further, the electronic components include an antenna feed. The microchip apparatus includes an antenna coupled to the antenna feed. The antenna includes multiple loops, each loop being formed by at least one layer of the metallic layers.

20 Claims, 5 Drawing Sheets

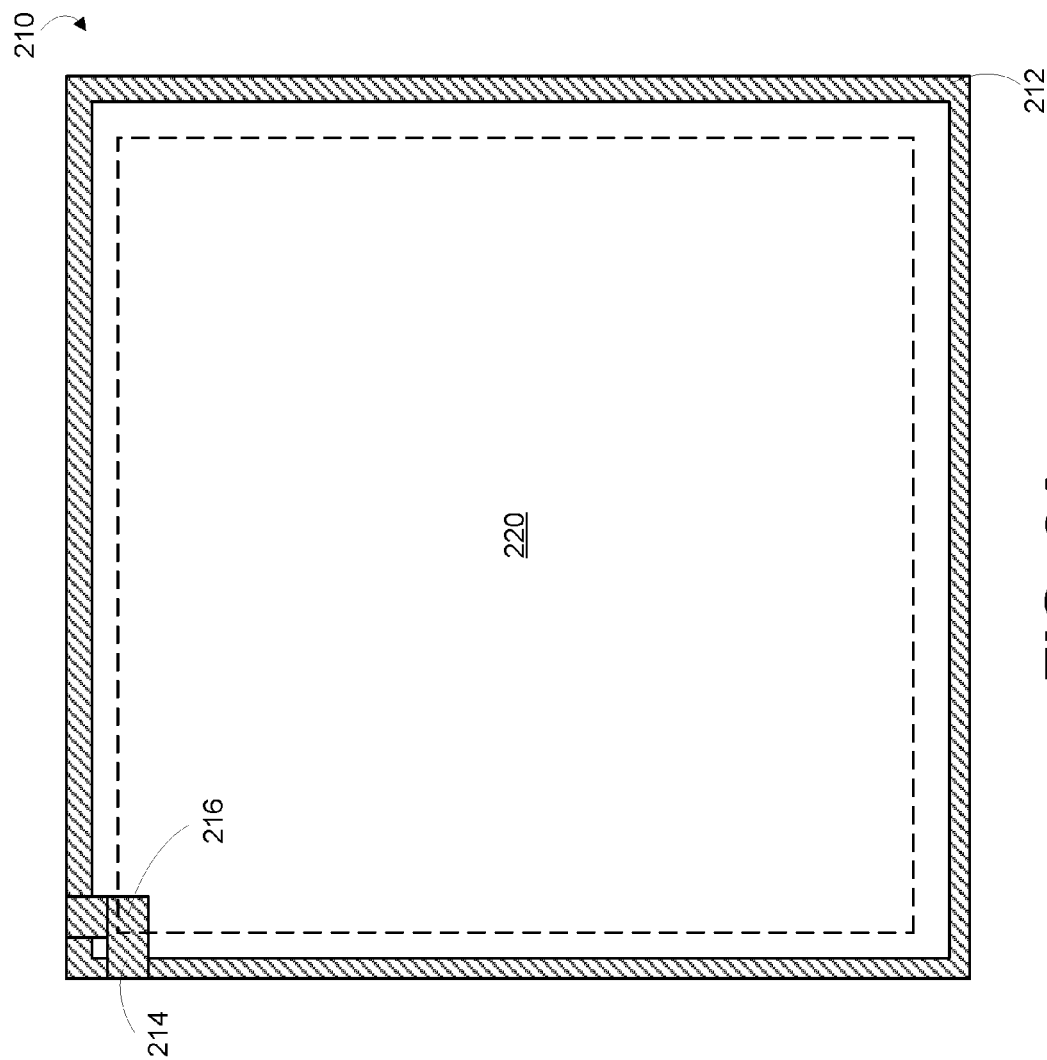

INTEGRATED ON-CHIP ANTENNA

CROSS REFERENCE TO RELATED APPLICATION

The present application claims priority to U.S. patent application Ser. No. 14/840,148, filed on Aug. 31, 2015 the entire contents of each are herein incorporated by reference.

BACKGROUND

Some electronic devices are of sufficiently small size that a power supply cannot reasonably accompany the device. In these instances, the electronic device may receive power from an external power source. For example, in a typical Radio-frequency identification (RFID) implementation, an RFID chip receives power externally via an antenna to power the chip. Further, the same antenna may be used to both supply power and communication data to the RFID chip. Therefore, the external power source may be configured to supply power to the electronic device wirelessly.

SUMMARY

Disclosed herein are examples that relate to a microchip apparatus, where the microchip apparatus comprises a plurality of metallic layers. Each of the metallic layers may have a respective layer thickness. The microchip apparatus also comprises one or more electronic components integrated within the metallic layers. The electronic components may be configured to communicate data. Further, the electronic components include an antenna feed. The microchip apparatus includes an antenna coupled to the antenna feed. The antenna includes multiple loops, where each loop being formed by at least one layer of the metallic layers. The antenna may be further configured to resonate at a resonant frequency.

In another aspect, the present application describes a method. The method includes receiving an electromagnetic signal with a loop antenna having an impedance. The impedance is based in part on a number of loops in the antenna. Further, at least one of the loops comprises a plurality of layers of a circuit board. Additionally, the loop antenna is located at a perimeter of a microchip. The method also includes rectifying at least a portion of the received electromagnetic signal to form a supply voltage. The method further includes powering one or more electronic components in the microchip with the supply voltage. Also, the method includes adjusting the impedance of the loop antenna via the one or more electronic components to communicate data.

In yet another example, an apparatus is provided. The apparatus may include a microchip having a perimeter. The microchip may include a plurality of metallic layers. The apparatus also includes an antenna located at the perimeter of the microchip. The antenna may have multiple loops and at least one loop of the antenna may include multiple metallic layers of the plurality of metallic layers coupled together to form a loop. The antenna may be further configured to resonate at a resonant frequency. The apparatus further includes one or more electronic components of the microchip configured to communicate data via the antenna.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

FIG. 2A is a bottom view of an example implantable device, in accordance with an example embodiment.

DETAILED DESCRIPTION

Figure 1:
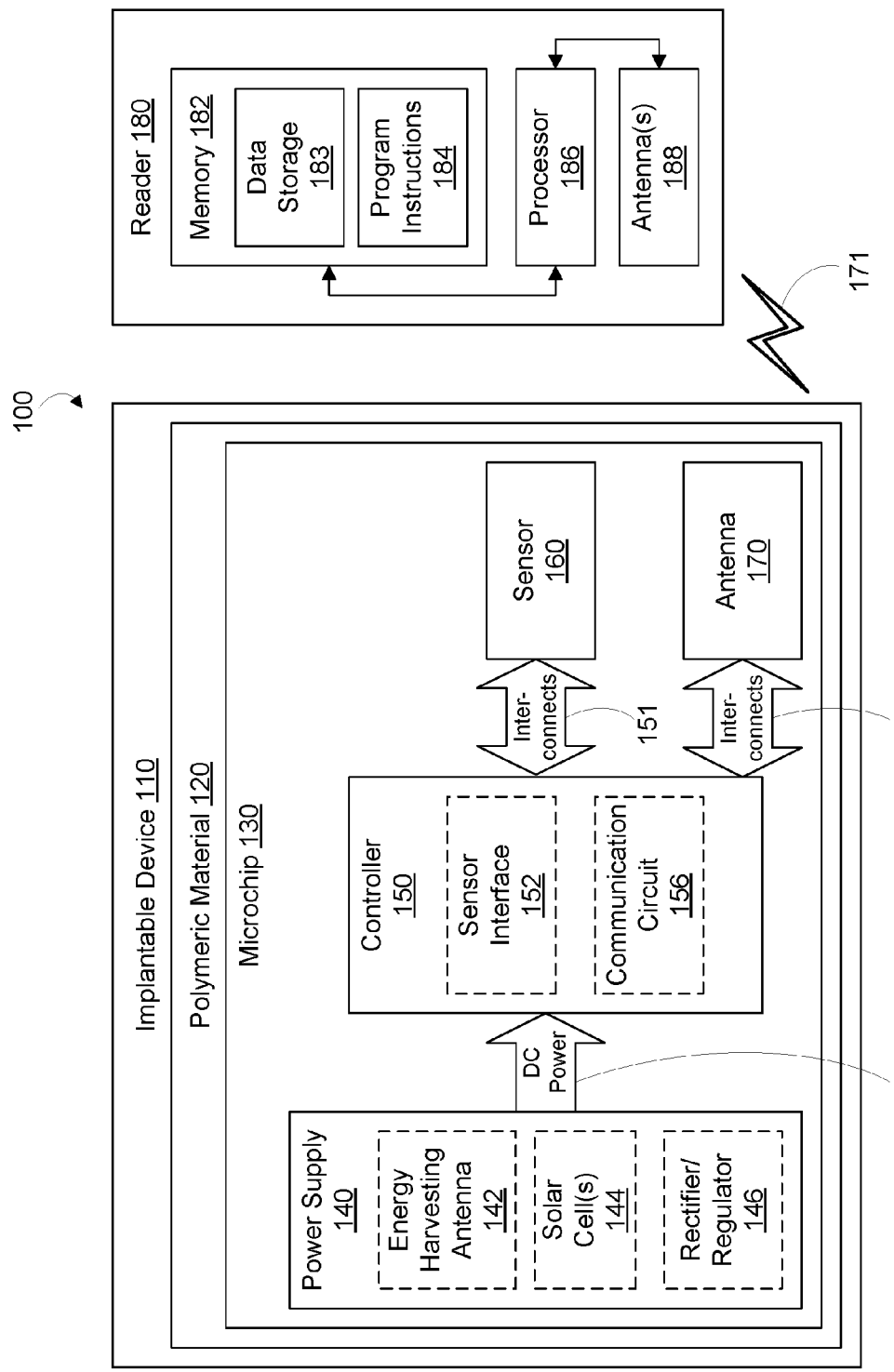
FIG. 1 is a block diagram of an example system that includes an implantable device in wireless communication with a reader, in accordance with an example embodiment.

In the following detailed description, reference is made to the accompanying figures, which form a part hereof. In the figures, similar symbols typically identify similar components, unless context dictates otherwise. The illustrative examples described in the detailed description, figures, and claims are not meant to be limiting. Other examples may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

One aspect of the present disclosure provides a chip-based antenna for use in an implantable microchip device. Typically, an antenna of a device is sufficiently larger than the size of individual components of the device. Additionally, a larger antenna may also allow for an antenna with a higher gain as compared to a smaller antenna. However, the antenna of the present disclosure fits within more restrictive space constraints than a traditionally-sized antenna in order to be used in the implantable microchip device. The present antenna may be advantageous due to both its size and its integration within a manufacturing process.

In this disclosure, the antenna may be either self-resonant or close to self-resonant in order to make the coupling magnetic field as large as possible. This approach can also beneficially reduce the size of a capacitor used to establish the resonance with the antenna (or may allow the additional capacitor to be eliminated entirely).

A loop antenna may be fabricated at the perimeter of a microchip as part of a multi-layer metal stack-up chip manufacturing process. Additionally, the antenna may be formed based on the combination of several chip layers to make a solid metal loop with low loss caused by the skin depth. For example, if a metal layer forming the antenna is sufficiently thick (i.e., approximately more than 3 skin depths of the frequency of operation of the antenna) then the layer can simply be used as separate loop layers. However, if a layer is less than approximately 3 skin depths of thickness, it may be too electrically lossy for sufficient antenna performance. Therefore, in order to create a thick enough layer, electrically thin layers may be combined through the use of vias. For example, two thin layers may be combined into a single thicker layer by having vias connect the layers. Thus, the antenna may be formed of multiple loops, where each loop is formed either by a single layer of the chip or multiple layers combined with vias.

This method may be expanded to create a self-resonant or nearly self-resonant loop antenna formed with multiple antenna loops in the various chip layers. An example antenna produced in this way may have a positive gain for the far field, a high Q, high magnetic field for near-field coupling, and it may resonate with little or no extra capacitance. In one example use, an antenna could be integrated within the RFID chip itself so that an external antenna is not used. Further, the present antenna may be used to communicate both power and data to the chip. Thus, the chip may be located in a position where a physical connection to provide power to the chip may not be practical.

An external reader device or "reader" can radiate radio frequency radiation to power the implantable microchip device. The implantable microchip may include a sensor, and the reader may control the operation of the sensor by controlling the supply of power to the microchip device. In some examples, the reader can operate to intermittently interrogate the microchip device to provide a reading by radiating sufficient radiation to power the microchip device to obtain a measurement and communicate the result.

The implantable microchip device can be configured with, or be part of, a Radio-frequency Identification (RFID) tag. The RFID tag and reader can communicate using an RFID protocol; e.g., an RFID Generation 2 protocol. The RFID tag can be configured to receive radio signals from the reader. In some embodiments, the reader's signals can be used for both communicating with and powering the RFID tag; while in other embodiments, the RFID tag can be a powered device; e.g., be configured with a battery that powers the tag. In embodiments, where a battery powers the tag, the reader's signals may be used to charge the battery. Therefore, the battery may be wirelessly charged in situ.

The reader can communicate with other devices than the RFID tag. As one possible example, the reader can be equipped with a Bluetooth interface as well as with an RFID interface. The reader can communicate with other devices, e.g., a display device, via a Bluetooth or other protocol. In one example, the reader can obtain data from the RFID tag using RFID command(s); e.g., the RFID Generation 2 standard Read command. Upon obtaining the data, the reader can store, process, and/or communicate the data using the Bluetooth interface to another device, such as the display device. Other interfaces for communicating with devices using other communication protocol(s) are possible as well.

As an example, the above-mentioned implantable microchip device can be configured with a sensor. The sensor can be configured to take measurements while implanted (e.g., implanted in tissue beneath a skin surface). Upon taking the measurements, the sensor may store data related to the measurements, and subsequently send the data upon request from the reader. The sensor could be an optical sensor, an electro-chemical sensor, a temperature sensor, a pressure sensor, or some other type of sensor.

FIG. 1 is a block diagram of a system 100 that includes an implantable device 110 in wireless communication with a reader 180. A microchip 130 of the system may include a power supply 140, a controller 150, a sensor 160, and a communication antenna 170. The sensor 160 may be operated by the controller 150 or it may operate based on receiving the DC Power 141. The power supply 140 supplies operating voltages to the controller 150 and/or the sensor 160. The antenna 170 is operated by the controller 150 to communicate information to and/or from the implantable device 110. The antenna 170, the controller 150, the power supply 140, and the sensor 160 can all be situated on the embedded microchip 130.

To facilitate implantation and maintain a small size, the microchip 130 may be mounted within a polymeric material 120. The polymeric material 120 can include one or more biocompatible materials, that enable the device 110 to be implanted within a person and/or animal.

The microchip 130 includes one or more layers in which conductive materials (e.g., gold, platinum, palladium, titanium, copper, aluminum, silver, metals, other conductive materials, combinations of these, etc.) can be patterned to create electrodes, interconnects, connection pads, antennas, etc. For example, the antenna 170 can be formed by forming a pattern of gold or another conductive material in one or more layers of the microchip 130 by deposition, photolithography, electroplating, etc. Similarly, interconnects 151, 157 between the controller 150 and the sensor 160, and between the controller 150 and the antenna 170, respectively, can be formed by depositing suitable patterns of conductive materials in one or more layers of the microchip 130. A combination of microfabrication techniques including, without limitation, the use of photoresists, masks, deposition techniques, and/or plating techniques can be employed to pattern materials and/or traces on the microchip 130. The microchip 130 can be made from a semiconductor, such as silicon.

The microchip 130 can have a thickness sufficiently small to allow the microchip 130 to be embedded in the polymeric material 120 without influencing the profile of the implantable device 110. The microchip 130 can have a thickness sufficiently large to provide structural stability suitable for supporting the electronics mounted thereon and large enough for the formation on an antenna on the surface of the microchip 130. For example, the microchip 130 can be shaped as a square or rectangle with a length on each side in the range of about 100-1000 micrometers and a thickness in the range of about 10-100 micrometers.

The power supply 140 is configured to harvest ambient energy to power the controller 150 and sensor 160. For example, a radio-frequency energy-harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the reader 180. That is, the functions of the communication antenna 170 and the energy harvesting antenna 142 can be accomplished with the same physical antenna.

A rectifier/regulator 146 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 146. The rectifier/regulator 146 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 146 can include one or more energy storage devices to mitigate high frequency variations in the ambient energy gathering antenna 142 and/or solar cell(s) 144. For example, one or more energy storage devices (e.g., a capacitor, an inductor, etc.) can be connected in parallel across the outputs of the rectifier 146 to regulate the DC supply voltage 141 and configured to function as a low-pass filter.

The controller 150 is turned on when the DC supply voltage 141 is provided to the controller 150, and the logic in the controller 150 operates the sensor 160 and the antenna 170. The controller 150 can include logic circuitry configured to operate the sensor 160 so as to interact with the antenna 170 to control the impedance of the antenna 170. The impedance of the antenna 170 may be used to communicate via backscatter radiation. Antenna 170 and backscatter radiation are discussed further below.

In one example, the controller 150 includes a sensor interface module 152 that is configured to interface with the sensor 160. The sensor 160 can be, for example, a sensor configured to measure one or more physiological properties, such as pulse rate, blood oxygenation, blood pressure, or the concentration of glucose or other analyte. The sensor 160 could be, for example, an optical sensor or an electrochemical sensor.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. As previously stated, in some examples, the implantable device 110 is configured to indicate a measurement obtained by sensor 160 by modulating an impedance of the antenna 170 in a manner that is perceivable by the reader 180. For example, the communication circuit 156 can cause variations in the amplitude, phase, and/or frequency of backscatter radiation from the antenna 170, and such variations can be detected by the reader 180.

It is noted that the block diagram shown in FIG. 1 is described in connection with functional modules for convenience in description. However, embodiments of the implantable device 110 can be arranged with one or more of the functional modules ("sub-systems") implemented in a single chip, integrated circuit, and/or physical component. For example, while the rectifier/regulator 146 is illustrated in the power supply block 140, the rectifier/regulator 146 can be implemented in a chip that also includes the logic elements of the controller 150 and/or other features of the embedded electronics in the implantable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply block 140 and controller block 150 need not be implemented as physically separated modules. Moreover, one or more of the functional modules described in FIG. 1 can be implemented by separately packaged chips electrically connected to one another.

Additionally or alternatively, the energy harvesting antenna 142 and the communication antenna 170 can be implemented with the same physical antenna. For example, a loop antenna can both harvest incident radiation for power generation and communicate information via backscatter radiation.

The reader 180 can be configured to be external to the wearer; i.e., is not part of the implantable device. Reader 180 can include one or more antennas 188 to send and receive wireless signals 171 to and from the implantable device 110. In some embodiments, reader 180 can communicate using hardware and/or software operating according to one or more standards, such as, but not limited to, a RFID standard, a Bluetooth standard, a Wi-Fi standard, a Zigbee standard, etc.

Reader 180 can also include a computing system with a processor 186 in communication with a memory 182. Memory 182 is a non-transitory computer-readable medium that can include, without limitation, magnetic disks, optical disks, organic memory, and/or any other volatile (e.g. RAM) or non-volatile (e.g. ROM) storage system readable by the processor 186. The memory 182 can include a data storage 183 to store indications of data, such as sensor readings (e.g., from the voltage sensor 160), program settings (e.g., to adjust behavior of the implantable device 110 and/or reader 180), etc. The memory 182 can also include program instructions 184 for execution by the processor 186 to cause the reader 180 to perform processes specified by the instructions 184. For example, the program instructions 184 can cause reader 180 to provide a user interface that can convey information communicated from the implantable device 110 (e.g., information relating to measurements obtained by the sensor 160). The reader 180 can also include one or more hardware components for operating the antenna 188 to send and receive the wireless signals 171 to and from the implantable device 110. For example, oscillators, frequency injectors, encoders, decoders, amplifiers, filters, etc. can drive the antenna 188 according to instructions from the processor 186.

In some embodiments, reader 180 can be a smart phone, digital assistant, or other portable computing device with wireless connectivity sufficient to provide the wireless communication link 171. In other embodiments, reader 180 can be implemented as an antenna module that can be plugged in to a portable computing device; e.g., in scenarios where the communication link 171 operates at carrier frequencies not commonly employed in portable computing devices. In even other embodiments, the reader 180 can communicate with an external display device via a wired or wireless connection.

Figure 2B:
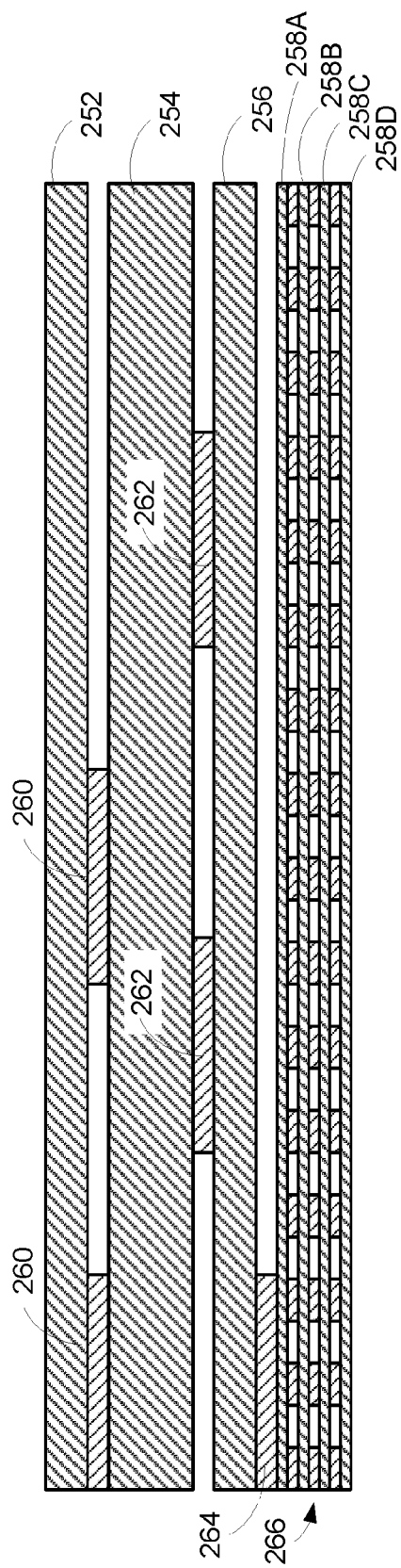
FIG. 2B is a side view of the example implantable device shown in FIG. 2A, in accordance with an example embodiment.

FIG. 2A is a top view of an example implantable microchip device 210, such as an implantable device. FIG. 2B is a side view of the example implantable microchip device 210 shown in FIG. 2A. It is noted that relative dimensions in FIGS. 2A and 2B are not necessarily to scale, but have been rendered for purposes of explanation only in describing the arrangement of the example implantable device 210. The implantable device 210 may be formed within a polymeric material (not shown) for bio-compatibility after implantation. In some embodiments, implantable device 210 can include some or all of the above-mentioned aspects of implantable device 110. In other embodiments, implantable device 110 can further include some or all of the herein-mentioned aspects of implantable device 210.

The implantable device 210 can have length and width dimensions in the range of about 100-1000 micrometers, and a thickness dimension in the rage of 10 to 100 micrometers. However, the diameter and thickness values are provided for explanatory purposes only. In general, the dimensions of the implantable device 210 can be selected according to the size and/or shape of the location where the implantable device 210 will be implanted.

As shown in FIG. 2A, the implantable device 210 may include an antenna 212, having an antenna feed 214. Additionally, the antenna 212 may be coupled to or include a capacitor 216. The implantable device 210 may also include integrated electronics 220. The integrated electronics 220 may include one more electronic components, for example, to provide the functions of controller 150 described above.

The antenna 212 of the implantable device 210 may be a loop antenna that forms the perimeter of the implantable device 210 (or is located proximate the perimeter of the device 210). The antenna 212 may be a loop antenna formed of multiple loops. Each loop of the multiple loops may be formed in one or more layers of the implantable device 210. For example, implantable device 210 may be a microchip that includes multiple layers. Each layer of the microchip may have a different layer thickness. By creating multiple loops in the various layers, and connecting one end of the loop to the opposite end of the loop in an adjacent layer, an antenna with multiple loops can be configured.

Additionally, by creating an antenna 212 that has multiple loops, the antenna may be electrically longer than if the antenna just had a single loop. For example, if an antenna has four loops, it may be four times as electrically long as a comparable single-loop antenna. By increasing the electrical length of the antenna, the antenna may have more desirable electrical characteristics. For example, the antenna may have a more desirable impedance and a may be closer to resonance.

The antenna 212 may be coupled to an antenna feed 214. The antenna feed 214 may allow an electrical signal received by the antenna 212 to be coupled into the integrated electronics 220. Additionally, the antenna 212 may include or be coupled to a capacitor 216. The capacitor 216 may be a discrete component or it may be a region of the antenna 212 or antenna feed 214 designed to increase an electrical capacitance. The capacitor 216 may be included as part of the antenna 212 to cause the antenna to resonate. Further, the capacitor 216 may be included as part of the antenna 212 to cause an adjustment to a resonant frequency of the antenna.

An antenna is said to operate at resonance when the impedance of the antenna, at the frequency of operation, is entirely real valued. That is, the reactance of the antenna is zero when the antenna is operated at a resonant frequency. By having the antenna operate at resonance (or near resonance), the coupling of the magnetic field to the antenna may be increased (or maximized). When an antenna is operated at or near its resonance frequency, the antenna typically will transmit and receive energy well. Further, the antenna may also be designed to have a high Q factor. A high Q generally indicates the bandwidth of the antenna is small compared to a center frequency of operation of the antenna.

In practice, the antenna 212 presented herein may have at least two different means of causing the antenna to resonate. First, the electrical length of the antenna 212 may be made large enough to cause "self-resonance", that is no external components are needed to cause the antenna to resonate. Second, a capacitor 216 may be included either as a discrete component or as a portion of the antenna 212 to cause the antenna 212 to resonate. Thus, antenna 212 may resonate in combination with capacitor 216.

The integrated electronics 220 may form the inner portion of the implantable device 210. The integrated electronics 220 may be formed on the implantable device 210 during the devices fabrication. For example, the integrated electronics 220 may be created during a microchip manufacturing process. The integrated electronics 220 may be formed from etching, masking, or other procedures used in microchip fabrication. The integrated electronics 220 may include functionality described herein. In some examples, the integrated electronics 220 include the components and/or functionality described with respect to FIG. 1 or FIG. 3.

FIG. 2B is a side view of the example implantable electronic device 210 shown in FIG. 2A. As shown in FIG. 2B, the implantable electronic device 210 may include multiple layers (252, 254, 256, and 258A-D). As shown in FIG. 2B, the implantable electronic device 210 has seven layers. In various different examples, the implantable electronic device 210 may have a greater or fewer number of layers. Additionally, as shown in FIG. 2B, the various layers may have different thicknesses. Some layers, such as layer 254 may be thick compared to the other layers and the layers labeled as 258A-D may be thin compared to the other layers. As previously discussed, a loop antenna may be formed of multiple loops. Each loop may be formed in one (or more) of the layers (252, 254, 256, and 258A-D).

The various layers may be connected to each other by interconnects, shown as interconnects 260, 262, and 264. The interconnects may allow a signal to move from a loop on one layer to move to another layer. For example, layer 252 is coupled to layer 254 by interconnect 260.

The thickness of a layer affects the electrical properties of a layer. When a layer becomes too thin, the electrical resistance of the layer degrades the electrical performance of the layer. When used as an antenna, a layer being too thin causes signal losses, decreasing antenna performance. Generally, it may be desirable for a layer that forms an antenna to be at least three skin depths thick. In one example, the skin depth ($\delta$) may be approximated based on Equation 1, below, where $\mu$ is the resistivity of the metal of the layer, $\omega$ is the angular frequency of the signal propagating in the layer, $\mu_r$ is the relative magnetic permeability of the conductor, and $\mu_0$ is the the magnetic permeability of free space.

$$\delta = \sqrt{\frac{2\rho}{\omega\mu_r\mu_0}} \qquad \text{EQUATION 1}$$

In the example shown in FIG. 2B, the layers 258A-D may each have a thickness less than 3 skin depths thick. Thus, each layer may be too thin to operate as an antenna by itself. However, as disclosed herein, multiple layers that may be too thin on their own may be combined to form a thicker layer. As shown in FIG. 2B, a plurality of vias 266 may be used to connect the layers 258A-D to form a single layer of sufficient thickness. Thus, as shown in FIG. 2B, multiple layers may be combined with vias (or by other means of electrical coupling) to form a loop that has a thickness greater than the individual layers. Thus, a loop for the loop antenna may be made from layers that are too thin to operate as a loop by themselves.

Although FIG. 2B shows four layers 258A-D forming the loop, in different examples more or fewer layers may be used to form a loop. Further, in different examples, the four layers 258A-D may have formed two different loops if vias were used to only bond two layers together. In yet further examples, an implantable electronic device 210 may have more than one group of layers that are too thin to operate by themselves, so there may be multiple regions where layers are coupled together to form a loop that is thicker than an individual layer.

Figure 3:
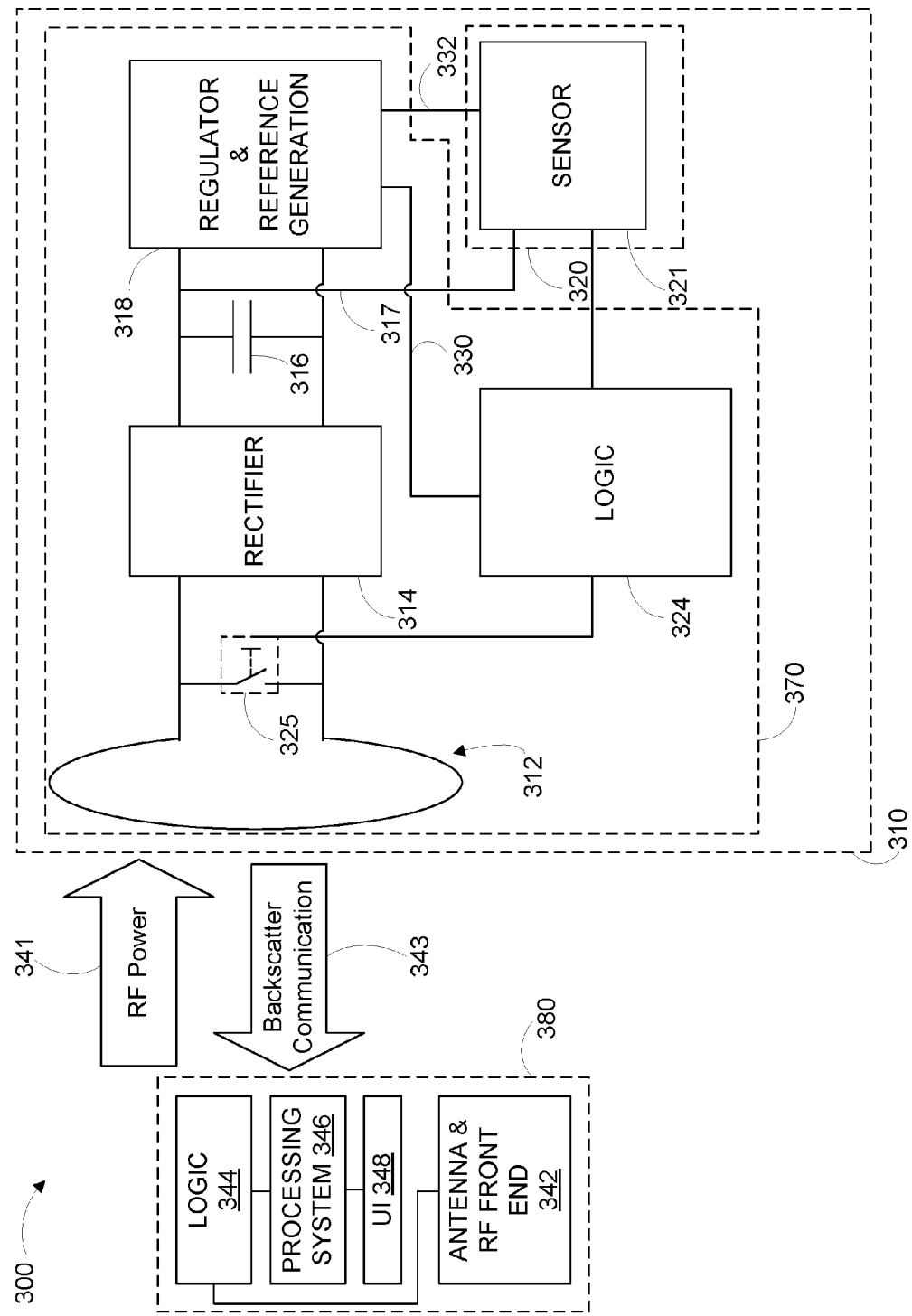
FIG. 3 is a functional block diagram of an example system having an implantable device, in accordance with an example embodiment.

FIG. 3 is a functional block diagram of a system 300 that includes an implantable device 310 with embedded electronic components in communication with and powered by reader 380. Reader 380 can also be configured to communicate with a display device (the display device may or may not be integrated with the reader 380 as UI 348). Reader 380 and implantable device 310 can communicate according to one communication protocol or standard, shown in FIG. 3 as RF Power 341. In one particular embodiment, the protocol used for RF Power 341 and Backscatter communication 343 is an RFID protocol. The implantable device 310 includes an antenna 312 for capturing radio frequency (RF) power 341 from the reader 380. The antenna 312 may also create backscatter communication 343.

The implantable device 310 includes rectifier 314, energy storage 316 (that may output unregulated voltage 317), and regulator 318 for generating regulated supply voltages 330, 332 to operate the embedded electronics. The implantable device 210 includes a sensor 321 that may have a sensor interface 320. The implantable device 310 includes hardware logic 324 for communicating results from the sensor 321 to the reader 380 by modulating the impedance of the antenna 312. An impedance modulator 325 (shown symbolically as a switch in FIG. 3) can be used to modulate the antenna impedance according to instructions from the hardware logic 324. Similar to the implantable device 110 discussed above in connection with FIG. 1, the implantable device 310 can include a mounting substrate, such as a microchip, embedded within a polymeric material configured to be implanted.

With reference to FIG. 3, in various embodiments, the sensor 321 may be configured to make various measurements, including but not limited to physiological measurements of a person in which the device is implanted, or making other measurements of the person in which the device is implanted. The connections shown in FIG. 3 are one example of possible configurations for the sensor 321. The sensor interface 320 may be configured as a part of the sensor 321 itself. For example, the sensor interface 320 may convert the output of the sensor 321 into a format that in understandable by the hardware logic 324.

The rectifier 314, energy storage 316, and voltage regulator 318 operate to harvest energy from received RF power 341. RF power 341 causes radio frequency electrical signals on leads of the antenna 312. The rectifier 314 is connected to the antenna leads and converts the radio frequency electrical signals to a DC voltage. The energy storage 316 (e.g., capacitor) is connected across the output of the rectifier 314 to filter out high frequency components of the DC voltage. The regulator 318 receives the filtered DC voltage (e.g. unregulated voltage 317) and outputs both a regulated supply voltage 330 to operate the hardware logic 324 and a regulated supply voltage 332 to operate the voltage sensor 321 of the sensor interface 320. For example, the supply voltage can be equivalent to the voltage of the energy storage 316. In another example, the supply voltage can be equivalent to the voltage of the rectified DC voltage from the rectifier 314. Additionally, the regulated supply voltage 330 can be a voltage suitable for driving digital logic circuitry, such as approximately 1.2 volts, approximately 3 volts, etc. The voltage needed as the regulated supply voltage 330 may change depending on a functionality requirement of the logic 324 (or a voltage requirement of other components of the implantable device 310). Reception of the RF power 341 from the reader 380 (or another source, such as ambient radiation, etc.) causes the regulated supply voltages 330, 332 to be supplied to the sensor 320 and hardware logic 324. While powered, the sensor 320 and hardware logic 324 are configured to generate and measure a voltage (such as either unregulated voltage 317 or regulated supply voltages 332) and communicate the results.

The sensor results can be communicated back to the reader 380 via backscatter radiation 343 from the antenna 312. The hardware logic 324 receives the supply voltage from the sensor interface 320 (or the voltage sensor 321 itself) and modulates (325) the impedance of the antenna 312 in accordance with the supply voltage measured by the sensor 320. The antenna impedance and/or change in antenna impedance are detected by the reader 380 via the backscatter signal 343.

Reader 380 can include an antenna and RF front end 342 and logic components 344 to communicate using a radio protocol, decode the information indicated by the backscatter signal 343, provide digital inputs to a processing system 346 and receive inputs and/or provide outputs via user interface 348. The radio protocol can be, for example, an RFID protocol. In some embodiments, part or all of implantable device 310 can be configured to perform some or all features of an RFID tag. For example, as shown in FIG. 3, some or all of the components shown as tag 370 of implantable device 310 can perform some or all features of an RFID tag; e.g., antenna 312, rectifier 314, energy storage 316, voltage regulator 318, hardware logic 324, etc.

In some embodiments, one or more of the features shown as separate functional blocks can be implemented ("packaged") on a single chip. For example, the implantable device 310 can be implemented with the rectifier 314, energy storage 316, voltage regulator 318, sensor interface 320, and the hardware logic 324 packaged together in a single chip or controller module. Such a controller can have interconnects ("leads") connected to the loop antenna 312 and the sensor electrodes 322, 323. Such a controller operates to harvest energy received at the loop antenna 312, measure the supply voltage created by the harvested energy, and indicate the measured supply voltage via the antenna 312 (e.g., through the backscatter communication 343).

A processing system, such as, but not limited to, processing system 346 or processing system 356, can include one or more processors and one or more storage components. Example processor(s) include, but are not limited to, CPUs, Graphics Processing Units (GPUs), digital signal processors (DSPs), application specific integrated circuits (ASICs). Example storage component(s) include, but are not limited to volatile and/or non-volatile storage components, e.g., optical, magnetic, organic or other memory, disc storage; Random Access Memory (RAM), Read-Only Memory (ROM), flash memory, optical memory unit, and disc memory. The storage component(s) can be configured to store software and data; e.g., computer-readable instructions configured, when executed by a processor of the processing system, to cause the processing system to carry out functions such as but not limited to the herein-described functions of reader 380 or implantable device 310.

The reader 380 can associate the backscatter signal 343 with the sensor result (e.g., via the processing system 346 according to a pre-programmed relationship associating impedance of the antenna 312 with output from the sensor 320). The processing system 346 can then store the indicated sensor results (e.g., induced supply voltage, glucose level, etc.) in a local memory and/or an external memory.

User interface 348 of reader 380 can include an indicator, such as but not limited to one or more light-emitting diodes (LEDs) and/or speakers, that can indicate that reader 380 is operating and provide some information about its status. For example, reader 380 can be configured with an LED that displays one color (e.g., green) when operating normally and another color (e.g., red) when operating abnormally. In other embodiments, the LED(s) can change display when processing and/or communicating data in comparison to when idle (e.g., periodically turn on and off while processing data, constantly stay on or constantly stay off while idle). The reader 380 may also provide an audio output.

Figure 4:
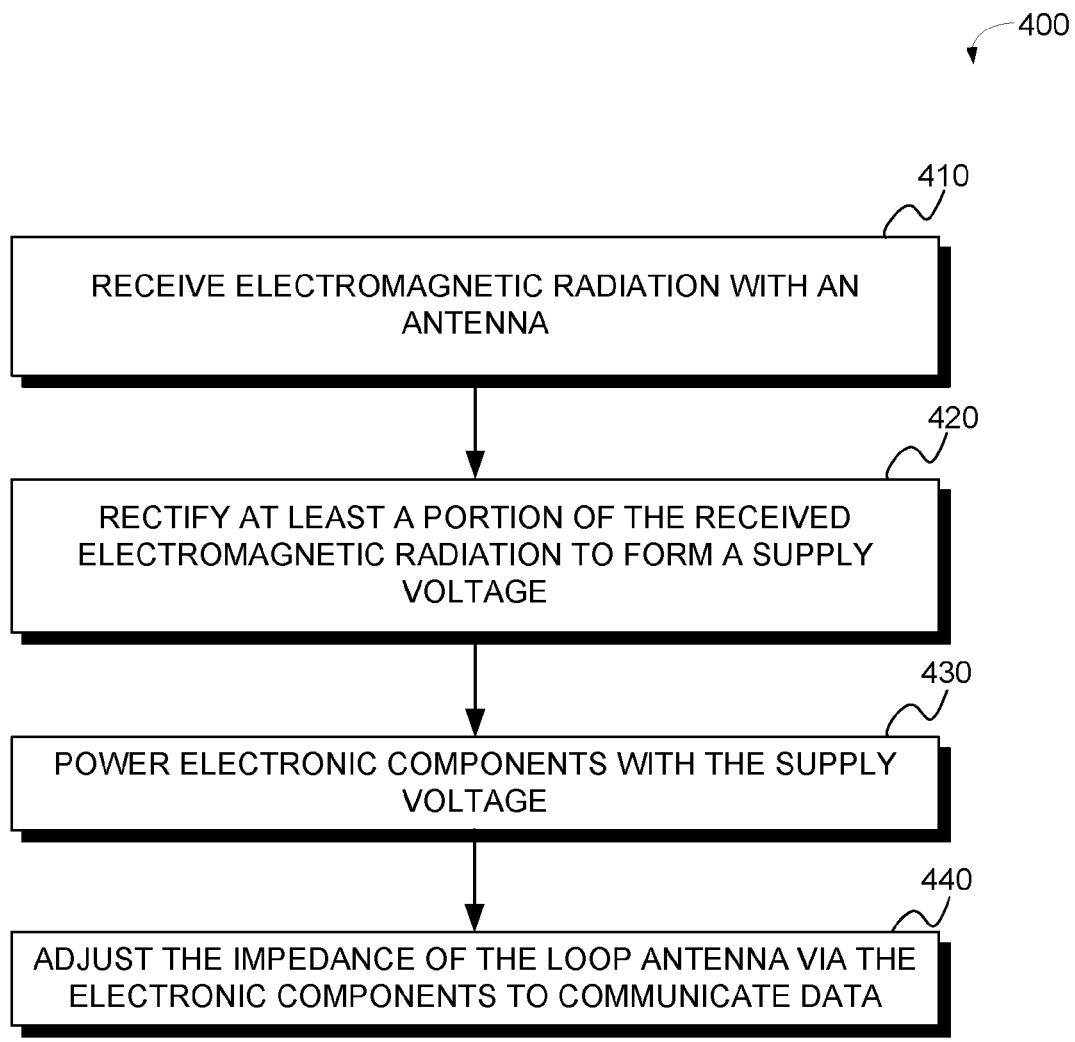
FIG. 4 is a flowchart of an example method, in accordance with an example embodiment.

FIG. 4 is a flowchart of an example method 400. Method 400 can be carried out by a device, such as a tag in an implantable device, or a device that includes a processor, such the hardware logic 324, the hardware logic may include a computer readable medium storing machine-readable instructions, where the machine-readable instructions, when executed by a processing component of the device, are configured to cause the device to carry out some or all of the techniques described herein as method 400.

Method 400 can begin at block 410. At block 410, the tag can receive electromagnetic radiation with a loop antenna having an impedance, such as discussed above in the context of at least FIGS. 1-3. The impedance of the antenna may be based in part on a number of loops in the antenna and the impedance may indicate the antenna is resonant (or near resonant). At least one of the loops of the antenna may include a plurality of layers of a microchip. Additionally, the loop antenna may be located at a perimeter of a microchip. The antenna may have the properties discussed within the rest of the present disclosure.

At block 420, the tag can rectify at least a portion of the received electromagnetic radiation output from the antenna. By rectifying the supply signal, a direct current (DC) supply voltage may be created. Because the supply signal may be a conversion of the propagating RF power to a guided electric RF signal, it may have alternating current properties. For example, the amplitude of the supply signal may vary from a positive voltage to a negative voltage. After rectification, the supply voltage does not have an amplitude that swings from positive to negative. Therefore, the supply voltage may be considered an unregulated DC supply voltage.

Additionally, the rectified supply voltage may also be applied across a capacitor or other electrical storage component. The capacitor (or storage component) may perform at least one of two functions. First, the capacitor may store some electrical energy. This electrical energy may be used to power components of the tag if the RF power is no longer applied to the antenna of the tag. Second, the capacitor may also provide some smoothing (e.g. low-pass filtering) of the rectified voltage. This smoothing may allow a more consistent supply voltage to be supplied to the various components of the tag.

At block 430, the device may power electronic components with the supply voltage. The electronic components may include at least a sensor and a component to adjust the antenna impedance. The supply voltage may be able to power the sensor to make various measurements (as previously discussed). The supply voltage may also provide power to the component configured to adjust the antenna impedance. Thus, by providing a supply voltage to the various electronic components, the electronic components may provide functionality.

At block 440, the tag may adjust an antenna impedance via the electronic components to communicate data. The antenna impedance may be adjusted in a way to cause a backscatter signal of the RF power. The backscatter signal may communicate the measured sensor data back to a reader device. Therefore, through the impedance adjustment, the tag may communicate the measured supply voltage back to the reader.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art.

Example methods and systems are described above. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Reference is made herein to the accompanying figures, which form a part thereof. In the figures, similar symbols typically identify similar components, unless context dictates otherwise. Other embodiments may be utilized, and other changes may be made, without departing from the spirit or scope of the subject matter presented herein. The various aspects and embodiments disclosed herein are for purposes of illustration and are not intended to be limiting, with the true scope and spirit being indicated by the following claims.

What is claimed is:

1. A microchip apparatus comprising:
a plurality of metallic layers, wherein each of the metallic layers has a respective layer thickness;
one or more electronic components, wherein the one or more electronic components are configured to communicate data, and wherein the one or more electronic components comprise an antenna feed; and
an antenna coupled to the antenna feed, wherein the antenna comprises multiple loops, and wherein each loop being formed by at least one layer of the metallic layers, wherein at least one loop of the antenna comprises multiple layers of the metallic layers, wherein the multiple layers are coupled together by a plurality of vias.

2. The microchip apparatus according to claim 1, wherein the antenna is designed to operate at a resonant frequency.

3. The microchip apparatus according to claim 2, wherein each of the multiple layers has a thickness less than or equal to three skin depths at the resonant frequency.

4. The microchip apparatus according to claim 1, further comprising a capacitor, wherein the antenna is configured to resonate at the resonant frequency in combination with the capacitor.

5. The microchip apparatus according to claim 1, wherein the one or more electronic components are configured to operate as a radio-frequency identification (RFID) device.

6. The microchip apparatus according to claim 1, wherein the antenna is located at a perimeter of the microchip.

7. The microchip apparatus according to claim 1, wherein the antenna is configured to receive a signal that can power the one or more electronic components, further comprising a supply-voltage circuit configured to rectify at least a portion of the received signal into a supply voltage for the one or more electronic components.

8. The microchip apparatus according to claim 1, wherein the one or more electronic components comprise an impedance-control circuit configured to adjust an impedance of the antenna in order to communicate data.

9. A method comprising:
receiving electromagnetic radiation with a loop antenna having an impedance, wherein the impedance is based in part on a number of loops in the antenna, wherein at least one of the loops comprises a plurality of layers of a microchip, wherein the multiple layers are coupled together by a plurality of vias;
rectifying at least a portion of the received electromagnetic radiation to form a supply voltage;
powering one or more electronic components in the microchip with the supply voltage; and
adjusting the impedance of the loop antenna via the one or more electronic components to communicate data.

10. The method according to claim 9, wherein the loop antenna is located at a perimeter of the microchip.

11. The method according to claim 9, further comprising resonating the antenna in combination with a capacitor.

12. The method according to claim 9, further comprising operating the one or more electronic components as a radio-frequency identification (RFID) device.

13. An apparatus comprising:
a microchip having a perimeter, wherein the microchip comprises a plurality of metallic layers;
an antenna located on the microchip, wherein the antenna comprises multiple loops, and wherein at least one loop of the antenna comprises multiple metallic layers of the plurality of metallic layers coupled together to form a loop, wherein the multiple layers are coupled together by a plurality of vias; and
one or more electronic components, wherein the one or more electronic components are configured to communicate data via the antenna.

14. The apparatus according to claim 13, wherein the antenna has an impedance and the electronic components are configured to communicate data by varying the antenna impedance.

15. The apparatus according to claim 13, further comprising a capacitor, wherein the antenna is configured to resonate at the resonate frequency in combination with the capacitor.

16. The apparatus according to claim 13, wherein the electronic components are configured to operate as a radio-frequency identification (RFID) device.

17. The apparatus according to claim 13, wherein the antenna is configured to receive a signal that can power the one or more electronic components, further comprising a supply-voltage circuit configured to rectify at least a portion of the received signal into a supply voltage for the one or more electronic components.

18. The apparatus according to claim 13, wherein the one or more electronic components comprise an impedance-control circuit configured to adjust an impedance of the antenna in order to communicate data.

19. The apparatus according to claim 13, wherein the antenna is configured to resonate at a resonant frequency.

20. The apparatus according to claim 19, wherein each of the multiple metallic layers has a thickness less than or equal to three skin depths at the resonant frequency.

* * * * *